Sept. 29, 1931.  H. VOGT ET AL  1,825,598
PROCESS FOR PRODUCING COMBINED SOUND AND PICTURE FILMS
Filed March 29, 1922
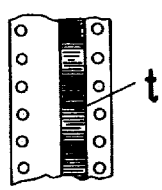
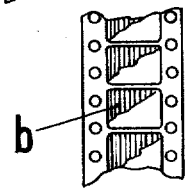
Fig. 1
Fig. 2
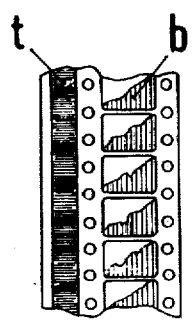
Fig. 3
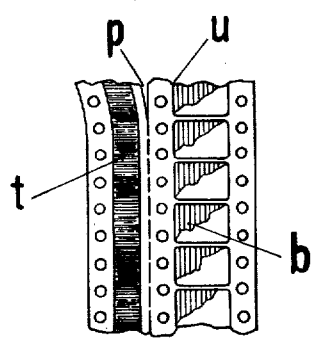
INVENTOR
Hans Vogt
Joseph Massolle
Josef Engl
BY
ATTORNEYS Patented Sept. 29, 1931

1,825,598

UNITED STATES PATENT OFFICE

HANS VOGT, OF BERLIN-WILMERSDORF, JOSEPH MASSOLLE AND JOSEF ENGL, OF BERLIN-GRUNEWALD, GERMANY, ASSIGNORS, BY MESNE ASSIGNMENTS, TO AMERICAN TRI-ERGON CORPORATION, OF NEW YORK, N. Y., A CORPORATION OF NEW YORK

PROCESS FOR PRODUCING COMBINED SOUND AND PICTURE FILMS

Application filed March 29, 1922, Serial No. 547,860, and in Germany April 14, 1921.

This invention relates to processes for producing combined sound and motion picture films.

In the production of speaking films it is of great advantage especially from the point of view of use, to arrange the sound sequence and the picture sequence upon one and the same piece of material (film).

In this procedure, however, there frequently occur in consequence of the changing lighting conditions in the cinematographing process, changes in the degree of exposure of the silver bromide coating, and this causes the picture sequence to be either overexposed or underexposed.

As the same film, however, carries close to the picture sequence the normally exposed sound sequence, these difficulties resulting from differences in exposure cannot be remedied in the case of combined negatives, by developing practices such as by weakening, strengthening and so forth. They can only be remedied by subjecting the underexposed or the overexposed portions of the negative to separate appropriate treatments.

Technically, this treatment is practically impossible so long as the two sequences—picture and sound—are photographed upon the same film strip.

According to the present invention the difficulty is overcome by either employing entirely separate films for the simultaneous photographing of the sound and picture negatives, or films which are connected during the photographing, but which are separated from one another before the developing, then separately developing the negatives if and in the manner required to remedy the difficulties, and then printing both sequences—picture and sound—on the different portions of the same positive film.

The synchronism is assured in both cases by the perforations and/or by corresponding marks. The production of the combined positive film can take place by copying the two negative films—sound and picture—preferably consecutively upon the same positive film.

In the drawing:

Figure 1 shows the two records, the sound record and the picture record, separately.

Figure 2 shows a combined record, and

Figure 3 shows a modified form of the same.

If for the record two separate films with standard perforations are used two negatives are produced as shown in Fig. 1. The sound-record comprises the row of tones $t$, the picture record comprises the row of pictures $b$. The tone row is preferably arranged near one edge of the film. The two negatives are then copied on a single film as shown in Fig. 2. If for the two records a common film is used, this has preferably the form shown in Fig. 3. This film comprises between two rows of perforations the picture record $b$ and the sound record $t$. Before the developing, the film is separated at $p$ or at $u$. If the sounds have to be recorded at the side of the picture record, outside one row of perforations, a film strip like the one shown in Fig. 2 is produced on which the picture record is between two rows of perforations whilst the sound record is arranged at one edge of the film strip, outside the corresponding row of perforations.

One can, however, previous to the printing, unite longitudinally together the two developed negative films, and then copy this so united negative in the usual manner.

Other benefits may also be derived from the broader aspects of the invention, i. e., from employing separate or separable film areas for the recording of the sound and picture negatives, and then printing both the sound and picture sequences on different portions of the same positive film.

In the following claims where reference is made to a "length of film" upon which a sound record is recorded, such "length of film" shall be interpreted as referring to a strip of film which may be either entirely separate from or merely separable from the film strip carrying the picture sequence.

While the invention has been described in detail with respect to certain particular preferred examples thereof which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:—

1. A process for producing a combined sound and picture positive film, for talking moving pictures, comprising, photographing a sequence of pictures on one length of film, and simultaneously photographing on another length of film a corresponding sequence of sounds accompanying the action, so as to expose the last mentioned length of film variously in correspondence with vocal or other sounds having slight or otherwise varying differences of tone and intensity, developing and treating the two negatives separately, to give the picture and sound negatives the length and character of development and treatment appropriate for each, and printing from both negatives upon the same side of a single integral transparent sensitized film, the coating of which is all of the same character, to form the sound sequence at one side of, and parallel to, the picture sequence.

2. A process for producing a combined sound picture positive film, for talking moving pictures, comprising, simultaneously photographing, on parallel lengths of a single film, a sequence of pictures on the one length of film, and on the other length of film a corresponding sequence of sounds accompanying the action, so as to expose the film variously in correspondence with vocal or other sounds having slight or otherwise varying differences of tone and intensity, separating the two lengths of film, developing and treating the two negatives separately, to give the picture and sound negatives the length and character of development and treatment appropriate for each, and printing from both negatives upon the same side of a single integral transparent sensitized film, the coating of which is all of the same character, to form the sound sequence at one side of, and parallel to, the picture sequence.

3. The method of producing talking moving pictures on the same film which comprises photographing simultaneously upon separate films the picture and the sound, and photographing the sound record on an unexposed portion of the picture film.

4. The method of producing talking moving pictures on the same film which comprises photographing simultaneously upon separate films the picture and the sound, and photographing the sound record on an unexposed portion of the picture film between the marginal edge and the sprocket perforations thereof.

5. A process for producing a combined sound and picture positive film, for talking moving pictures, comprising, photographing a sequence of pictures on one length of film, and simultaneously photographing on another length of film a corresponding sequence of sounds accompanying the action, separately developing the two negatives in a manner appropriate for each, and printing the sound and picture negatives respectively upon different longitudinally extending portions of the same sensitized film, to form the sound sequence at one side of and along the picture sequence.

6. A process for producing a combined sound and picture positive film, for talking moving pictures, comprising, photographing a sequence of pictures on one length of film, and simultaneously photographing on another length of film a corresponding sequence of sounds accompanying the action, so that the picture and sound negatives may be separately developed in a manner appropriate for each, and printing the sound and picture negatives respectively upon different longitudinally extending portions of the same sensitized film, to form the sound sequence at one side of and along the picture sequence.

7. A process for producing a combined sound and picture positive film, for talking moving pictures, comprising, photographing a sequence of pictures on one length of film, and simultaneously photographing on another length of film a corresponding sequence of sounds accompanying the action, so that the picture and sound negatives may be separately developed in a manner appropriate for each, and printing the sound and picture negatives respectively upon the same face of the same sensitized film at different longitudinally extending portions thereof, to form the sound sequence at one side of and along the picture sequence.

8. The method of producing a talking moving picture record on a single film which comprises photographing simultaneously upon separate films the picture and the sound to form separate negatives, photographing said negative picture record upon a portion of a sensitized film not exposed to a sound record, and photographing the negative sound record on the same face of said last film and at a portion thereof not exposed to the picture record.

9. The method of producing a talking moving picture record on a single film which comprises photographing simultaneously upon separate films the picture and the sound to form separate negatives, photographing said negative picture record upon a portion of a sensitized film not exposed to a sound record, and photographing the negative sound record on the same face of said last film and at a portion thereof not exposed to the picture record, said last two photographing steps being performed consecutively.

10. A process for producing a combined sound and picture positive film, for sound motion pictures, comprising, photographing a sequence of pictures on one length of film, and photographing on another length of film a corresponding sequence of sound vibrations to accompanying the action, separately developing the records of said two lengths of film in a manner appropriate for each, and printing such developed sound and picture records respectively upon different longitudinally extending portions of a single sensitized film, to form the sound sequence at one side of and along the picture sequence.

11. A process for producing a combined sound and picture positive film, for talking moving pictures, comprising, photographing a sequence of pictures on one length of film, and simultaneously photographing on another length of film a corresponding sequence of sounds accompanying the action, separately developing the records of said two lengths of film in a manner appropriate for each, and printing such developed sound and picture records respectively upon different longitudinally extending portions of a single sensitized film, to form the sound sequence at one side of and along the picture sequence.

HANS VOGT.
JOSEPH MASSOLLE.
Dr. JOSEF ENGL.

DISCLAIMER 1,825,598.—*Hans Vogt*, Berlin-Wilmersdorf, and *Joseph Massolle* and *Josef Engl*, Berlin-Grunewald, Germany. PROCESS FOR PRODUCING COMBINED SOUND AND PICTURE FILMS. Patent dated September 29, 1931. Disclaimer filed November 23, 1932, by the assignee, *American Tri-Ergon Corporation*.

Hereby enters this disclaimer to that part of the claim which it does not choose to claim or hold by virtue of the patent or said assignments, to wit:

(a) The process as set forth in claim 6, except wherein the picture and sound negatives are separate films at the time of development.

(b) The process as set forth in claim 7, except wherein the sequence of pictures is photographed upon a film separate from that upon which the sequence of sounds is photographed, and the picture and sound negatives are separately developed, in a manner appropriate for each, and are consecutively printed upon the same sensitized film.

[*Official Gazette December 13, 1932.*]